(12) United States Patent
Almeida Cavoto et al.

(10) Patent No.: US 11,150,271 B2
(45) Date of Patent: Oct. 19, 2021

(54) METHOD OR SYSTEM FOR MANAGEMENT OF A DEVICE FOR ENERGY CONSUMPTION BY APPLYING BLOCKCHAIN PROTOCOL

(71) Applicant: International Business Machines Corporation, Armonk, NY (US)

(72) Inventors: Paulo Henrique Almeida Cavoto, Campinas (BR); Argemiro Jose de Lima, São Paulo (BR); Alan Braz, Yorktown Heights, NY (US); Heloisa Caroline De Souza Pereira Candello, São Paulo (BR); Fabrizio Nascimento Caldas, Sumaré (BR)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 15/980,087

(22) Filed: May 15, 2018

(65) Prior Publication Data
US 2019/0353685 A1 Nov. 21, 2019

(51) Int. Cl.
*G05B 13/02* (2006.01)
*G01R 11/57* (2006.01)
(Continued)

(52) U.S. Cl.
CPC .............. *G01R 11/57* (2013.01); *G06Q 20/36* (2013.01); *G06Q 50/06* (2013.01); *H04L 9/0637* (2013.01);
(Continued)

(58) Field of Classification Search
CPC ....... H04L 9/06; H04L 29/08; H04L 2209/38; H04L 2209/56; H04L 67/1042;
(Continued)

(56) References Cited

U.S. PATENT DOCUMENTS 8,461,725 B1 * 6/2013 Stubbs .................... H01H 9/54
307/140
9,607,293 B2    3/2017 McMillen et al.
(Continued)

OTHER PUBLICATIONS

Kang et al. "Enabling Localized Peer-to-Peer Electricity Trading Among Plug-in Hybrid Electric Vehicles Using Consortium Blockchains" from "IEEE Transactions On Industrial Informatics, vol. 13, No. 6, Dec. 2017" (Year: 2017).*
(Continued)

*Primary Examiner* — Yuhui R Pan

(57) ABSTRACT

Devices that consume power may be individually and uniquely associated with a blockchain wallet into which funds may be transferred. The device can be provided with a client application that executes within the device to determine an energy provider and the cost rate of energy supply. The client application calculates a value of energy consumption by the device and creates a blockchain transaction to transfer a funds value for the energy consumption from the device's blockchain wallet to a wallet of the energy provider. By providing devices that can self-manage their electricity supply and the accounting thereof, billing of power can be decentralized from a meter that meters all supply to a premises to individual devices. The requirement for a central billing entity, billing address, etc. can also be removed.

19 Claims, 10 Drawing Sheets

(51) Int. Cl.
*G06Q 20/36* (2012.01)
*G06Q 50/06* (2012.01)
*H04L 29/08* (2006.01)
*H04L 9/06* (2006.01)

(52) U.S. Cl.
CPC ...... *H04L 67/1042* (2013.01); *G05B 13/0255* (2013.01); *H02J 2310/14* (2020.01); *Y02B 70/30* (2013.01)

(58) Field of Classification Search
CPC ..... H04L 67/12; H04L 9/0637; H04L 9/3239; H04L 9/3247; G06Q 20/36; G06Q 50/06; G06Q 20/145; G06Q 20/367; G06Q 2220/00; G01R 11/57; G01R 22/063; G05B 13/0255; G07F 15/003; H02J 2310/14; Y02B 70/30; Y04S 20/222; Y04S 20/242
USPC .......................................................... 700/286
See application file for complete search history.

(56) References Cited

U.S. PATENT DOCUMENTS

| | | | |
|---|---|---|---|
| 9,691,055 | B2 | 6/2017 | Behren et al. |
| 9,722,970 | B2 | 8/2017 | Prince et al. |
| 9,779,399 | B2 | 10/2017 | Poornachandran et al. |
| 9,785,369 | B1 | 10/2017 | Ateniese et al. |
| 9,785,936 | B1 | 10/2017 | Baird |
| 9,946,237 | B2 * | 4/2018 | Nishibayashi ...... H02J 13/0006 |
| 10,022,613 | B2 * | 7/2018 | Tran ........................ A41D 1/00 |
| 2003/0009301 | A1 * | 1/2003 | Anand ................... G06Q 30/04 702/62 |
| 2006/0123807 | A1 * | 6/2006 | Sullivan ................ G01D 4/004 62/129 |
| 2010/0145535 | A1 * | 6/2010 | Tyler ........................ B60L 3/04 700/292 |
| 2013/0097070 | A1 * | 4/2013 | Baker .................... G06Q 30/06 705/38 |
| 2013/0282588 | A1 | 10/2013 | Hruska |
| 2017/0103468 | A1 | 4/2017 | Orsini et al. |
| 2017/0116693 | A1 | 4/2017 | Rae et al. |
| 2017/0140408 | A1 | 5/2017 | Wuehler |
| 2017/0206522 | A1 | 7/2017 | Schiatti et al. |
| 2017/0221052 | A1 * | 8/2017 | Sheng ................ G06Q 20/3829 |
| 2017/0279774 | A1 | 9/2017 | Booz et al. |
| 2018/0117446 | A1 * | 5/2018 | Tran ........................ A61B 5/11 |
| 2018/0117447 | A1 * | 5/2018 | Tran ........................ G01L 5/0052 |
| 2019/0188962 | A1 * | 6/2019 | Higgins .............. G07F 17/3239 |
| 2019/0353685 | A1 * | 11/2019 | Almeida Cavoto ... G06Q 20/36 |

OTHER PUBLICATIONS

Bahga et al.; "Blockchain Platform For Industrial Internet Of Things", Journal Of Software And Applications, vol. 9, No. 10, Oct. 28, 2016, pp. 533-546.
Kang et al.; "Enabling Localized Peer-To-Peer Electricity Trading . . . Blockchains", IEEE Transactions On Industrial Informatics, vol. PP, Issue 99, May 29, 2017, pp. 1-10.
Luc et al.; "The Use Of Blockchain In Peer-To-Peer Energy Transactions", toomuch.energy Pulished Paper, Mar. 2017, pp. 1-19.
Lundqvist et al.; "Thing-To-Thing Electricity Micro Payments Using Blockchain Technology", Global Internet Of Things Summit, Jun. 6-9, 2017, pp. 1-6.

* cited by examiner

METHOD OR SYSTEM FOR MANAGEMENT OF A DEVICE FOR ENERGY CONSUMPTION BY APPLYING BLOCKCHAIN PROTOCOL

TECHNICAL FIELD

This application generally relates to managing the power consumption of one or more devices, and more particularly, to accounting for energy consumption by devices using a blockchain network.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Blockchain technology can be used as a payment system for virtual any commodity. Each user and merchant that wishes to transact on the blockchain may maintain a blockchain wallet. Funds can be transferred into the wallet by the wallet owner. Funds can then be transferred between wallets in payment for goods and services. All transactions can be registered on the blockchain, thereby providing a secure, immutable record of the transfer. In addition, the transaction can be governed by a smart contract (self-executing contract) or similar record that specifies various aspects of the transaction, such as timing of the payment, conditions of payment, conditions of service, etc.

Currently the financial process between a power provider and a consumer has to pass through a physical address and a bill. Bills can be electronic or come physically by mail, but a bill is linked to an address and a person or provider company responsible for the account.

It is somewhat limiting in that in order to consume energy today an account has to be created by a person or company with the power provider, an address for billing and energy consumption must be provided and the billing process is centralized and carried out by one specific party. Validations of consumption are all done by the power provider, usually manually by an employee reading the electric meter of every house every month. This is a very costly and error prone approach, besides the absence of separate unbiased parties to confirm the amount consumed at the time of the billing. Also, the energy is provided without any guarantee that the consumer will have funds at the time of the billing.

What is required is an improved system and method for accounting for energy consumption.

SUMMARY

One example embodiment may provide a method that includes one or more of determining, by a device connected to an electrical outlet of a premises, a power consumption through the device. The device may determine a value for the power consumption and initiate a transfer of the value from a blockchain wallet associated with the device to a blockchain wallet associated with an energy provider for the power consumption.

Another example embodiment may provide a device that includes one or more connectors for connecting the device to an electrical outlet of a premises, one or more power meters that measure power consumption through the device, one or more processors and one or more memories operatively associated with the processor. The device may include one or more instructions sets executable by the one or more processors that, when executed, cause the one or more processors to perform a calculation of a cost of power consumption for the device, and an initiation of a transfer of a value for the cost of power consumption for the device from a blockchain wallet associated with the device to a blockchain wallet associated with a power provider for the power consumption.

A further example embodiment may provide a non-transitory computer readable medium comprising instructions, that when read by a processor, cause the processor to perform one or more of a calculation of a cost of power consumption for a device comprising one or more power consuming components that consume power to perform one or more intended functions of the device, and an initiation of a transfer of a value for the cost of power consumption for the device from a blockchain wallet associated with the device to a blockchain wallet associated with a power provider for the power consumption.

DETAILED DESCRIPTION

Figure 1A:
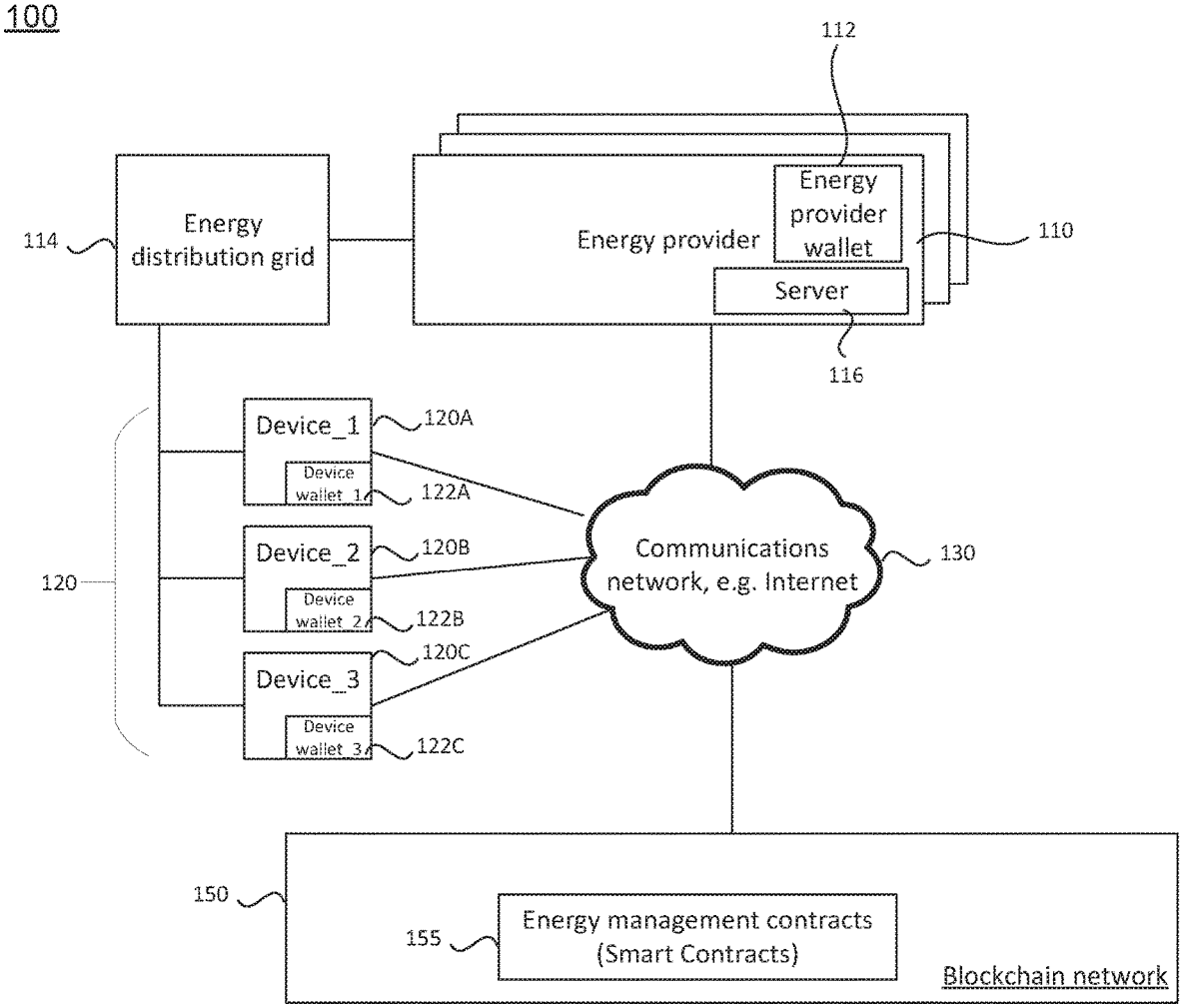
FIG. 1A illustrates a network diagram of a blockchain network that can be used to provided self-managing power accounting for devices, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide for the management of a device for energy consumption by applying a blockchain protocol.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Devices that consume power may be individually and uniquely associated with a blockchain wallet into which funds may be transferred. The device can be provided with a client application that executes within the device to determine an energy provider and the cost rate of energy supply. The client application calculates a value of energy consumption by the device and creates a blockchain transaction to transfer a funds value for the energy consumption from the device's blockchain wallet to a wallet of the energy provider. By providing devices that can self-manage their electricity supply and the accounting thereof, billing of power can be decentralized from a meter that meters all supply to a premises to individual devices. The requirement for a central billing entity, billing address, etc. can also be removed, as can the need to attend a premises.

FIG. 1A illustrates a logic network diagram of a network 100 involving a blockchain network 150 for decentralizing electricity payments according to example embodiments. Referring to FIG. 1A, the network 100 includes one or more energy providers 110 that supply energy via a power distribution network, e.g. energy grid 114 to devices 120 via power outlets (not shown) within a premises. The energy provider 110 has an associated blockchain wallet 112. The energy provider 110 may be configured to communicate with the blockchain 150 via a communications network 130 such as the Internet. The energy provider 110 may include or otherwise access a server 116. Via the server 116, the energy provider 110 is able to provide various content to potential customers using the communications network 130. The content may include energy cost rates, environmental policies, supply location data, etc., and other such content to enable a customer to select the energy provider as their provider. While only one energy provider 110 is shown, in a typical energy supply network, there will be multiple energy providers capable of supplying energy to a particular premises and a customer will be able to choose their energy provider based on various factors including cost, reliability, renewable energy component, etc. A central information source may be created to provide information about all energy providers, their costs and location information.

The devices 120, of which three devices 120A, 120B and 120C are shown, may be located within a single premises or in multiple premises. The devices may be owned by a single user or by multiple users. The devices may be any of a number of power consuming devices. Devices may include consumer electronics including, without limitation a telephone, fridge, television, computer, washing machine, toaster, oven, microwave oven, clock, home entertainment equipment, gaming devices, device chargers (e.g. phone or laptop chargers), or anything powered by electricity. The device may be a residential, commercial or industrial appliance. The device 120A, 120B, 120C may include one or more power distribution components including adapters, electrical outlet meters, power distribution boards etc. that while not comprising power consuming devices themselves, provides a conduit for other power consuming devices to connect to the electricity supply. The device 120A, 120B, 120C has a hardware with compute powers, such as a processor and at least one operatively associated memory. The device may be configured for internet communications via the network 130. Typically, though not exclusively, the device may include a wifi transceiver that is able to communicate with a wifi router within a premises. Alternatively, the device may include one or more LAN connections that connect to a router. Alternatively, the device may include a mobile communications module for accessing the internet via mobile telecommunications protocols. Alternatively, the device may be configured to receive and send communication signals via the power lines. Other methods for providing internet communications to the device will be apparent to the person skilled in the art.

The devices 120 are each configured to plug into an electrical outlet/powerpoint of the respective premises.

The device 120 may be configured with implementation software as will be described below. The device may also be configured or associated with a respective device wallet 122. In FIG. 1A, each of the devices 120A, 120B, 120C has an associated device wallet 122A, 122B, 122C respectively. The device wallets 122A, 122B, 122C provide the means for initiating transactions on the blockchain network, store account balances, transaction keys, transaction addresses (public/private keys, etc.).

Many electronic devices such as a refrigerator, TV, etc. have a ready made user interface and network connectivity. Such an interface may allow the devices to be configured with the software and blockchain wallet after purchase and installation. Devices that do not have such an interface or application install capability may come from the factory with the software already installed. Similarly, devices without user interface or application install capability would come from the factory with a blockchain wallet.

Each device 120 is able to communicate with the blockchain network 150 via the network 130. The blockchain network 150 receives transactions from the devices and/or the energy provider and may facilitate payments between the devices and the energy provider as will be described in more detail below. The blockchain may utilize one or more smart contracts 155, including energy management contracts to undertake various blockchain processes.

Figure 1B:
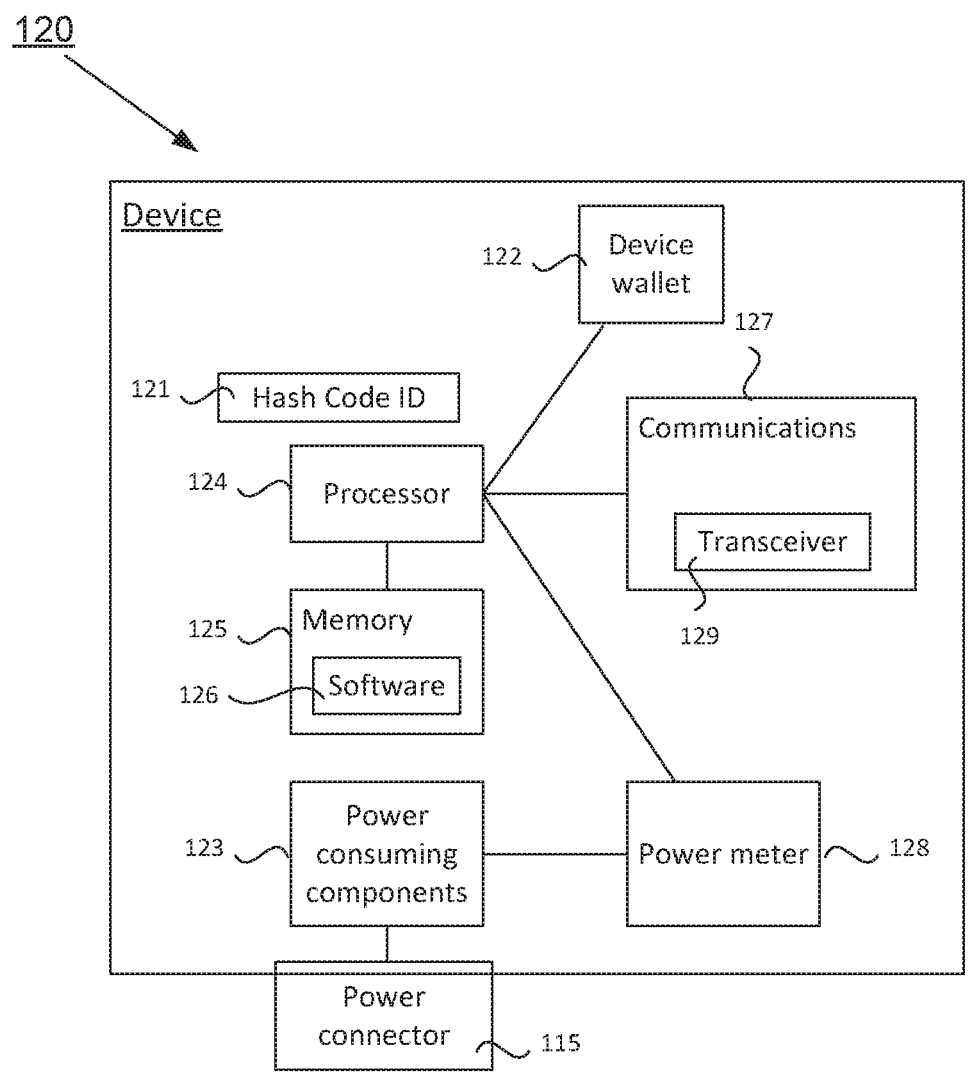
FIG. 1B illustrates a schematic of a power consuming device with an associated blockchain wallet, according to example embodiments.

FIG. 1B illustrates a logic diagram of a device 120 according to example embodiments. Referring to FIG. 1B, a device 120 will typically include a power connector 115 for connection to an electrical supply, e.g. mains grid, via a powerpoint, or similar electrical outlet. The power connector 115 may be a standard 2 pin or 3 pin electrical plug, a USB connector, or any similar power connector that enables the device 120 to connect to a power source. The device 120 may include power consuming components 123 that draw power from the electrical connector 115 to perform the intended functions of the device. For example, a refrigerator will typically include a compressor, condenser fan, evaporator fan, lights, thermostats, etc. The present embodiments are not limited to one type of device and thus the specific power consuming components are not considered essential herein. In an alternative embodiment, the device 120 may be a device such as a powerpoint, adapter, powerboard, transformer etc. that provides a conduit for other power consuming devices to connect to the electricity supply. The device 120 may include a power meter 128 for measuring the power consumption through the device 120.

The device 120 further includes computing hardware such as a processor 124 and operatively associated memory 125. The memory may store software 126, instructions sets and code executable by the processor for performing a number of functions. The functions may include functions for operation of the device, control programs, etc. The memory 125 may also store code for executing electricity management programs in accordance with example embodiments as will be described in more detail below, including communication with the blockchain network via a communications module 127. As described above, the communications module 127 may include a transceiver 129 configured for communications via one or more of WiFi, LAN, mobile telecommunications, etc.

The device 120 includes a blockchain wallet 122. The wallet may be a hardware wallet or similar. The wallet 122 may store one or more keys that can be used to generate blockchain transactions on the blockchain network. In one embodiment, the device wallet 122 may store a root key or master seed that is used to generate transaction addresses for blockchain transactions. The device wallet 122 may utilize the processor and memory 124/125 of the device 120 or may be provided with its own dedicated processor, e.g. IC chip, and memory.

Each device may include a hash code ID 121 that can be used to identify the device to one or more networks, including the blockchain network 150. The hash code ID 121 may be used to generate transactions for the device's blockchain wallet 122.

Figure 2A:
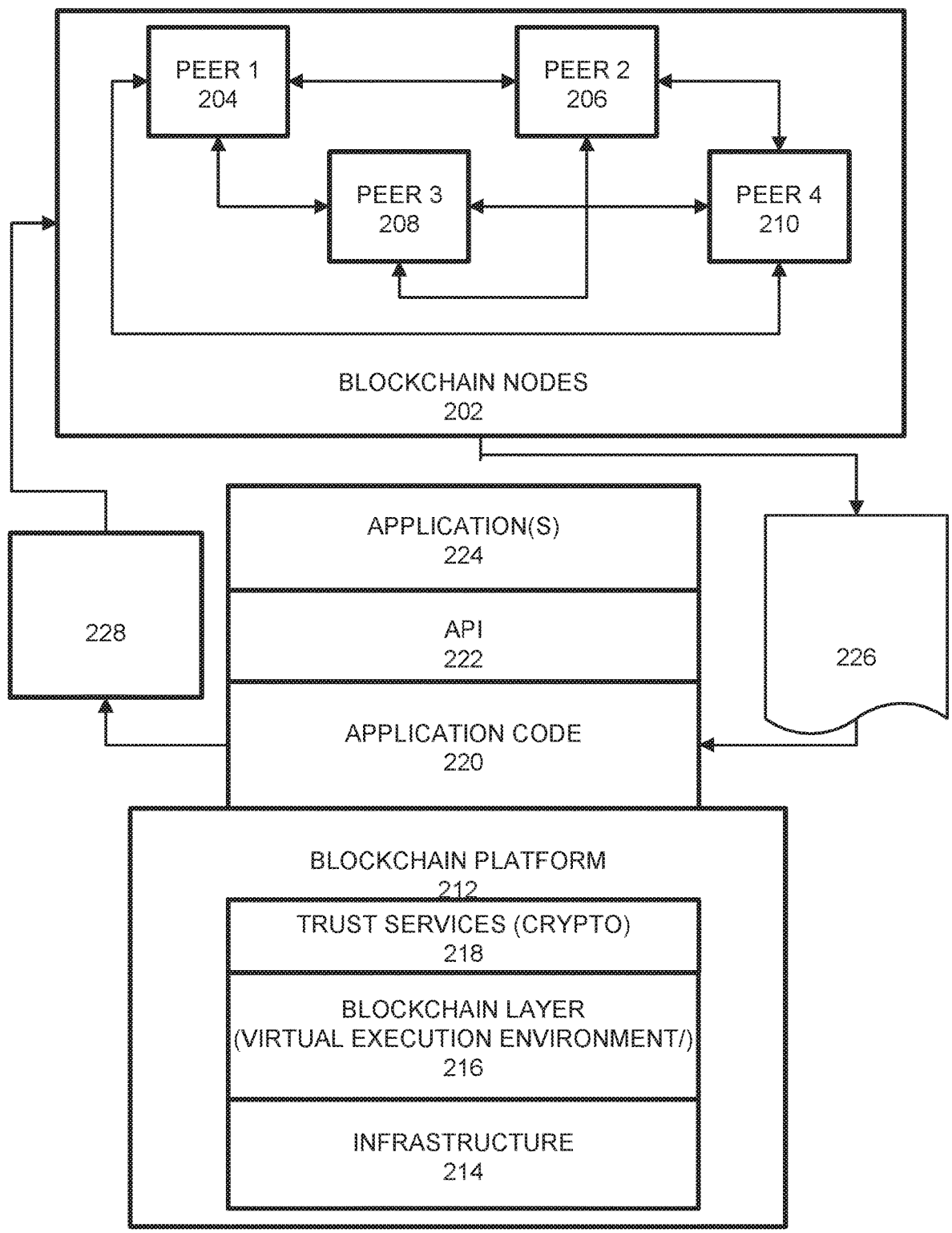
FIG. 2A illustrates an example peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, device power consumption information 226 may be processed by one or more processing entities (e.g., virtual machines) included in the blockchain layer 216. The energy transaction result 228 may include a transaction that transfers a value for power consumed by the device to the power provider. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a smart contract 226 detailing an energy transaction may be provided to one or more of the nodes 204-210. The smart contract 226 may specify a device wallet, an energy provider wallet, an energy consumption and a value of the energy consumption, being the funds amount to be transferred from the device wallet to the energy provider wallet.

Figure 2B:
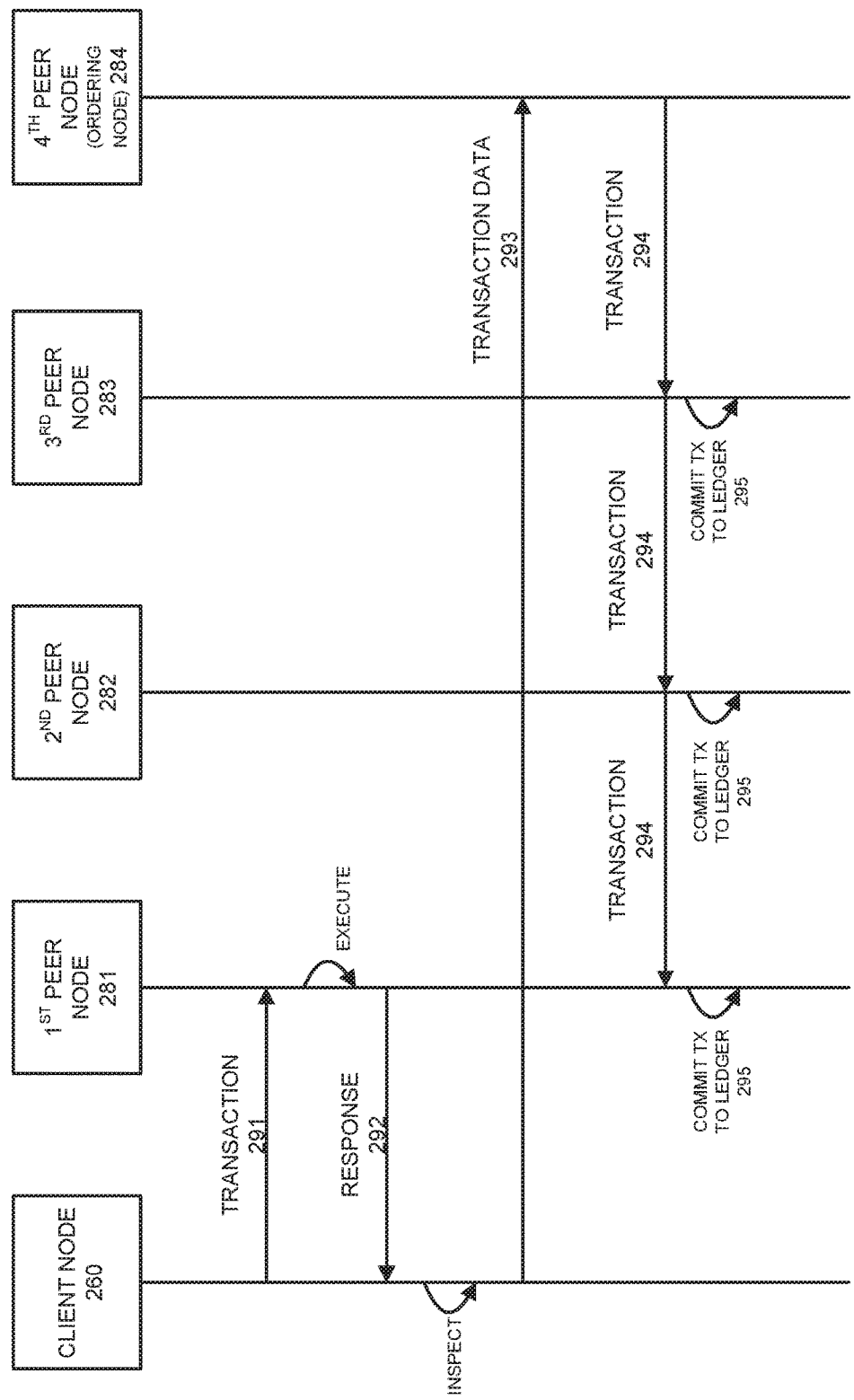
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
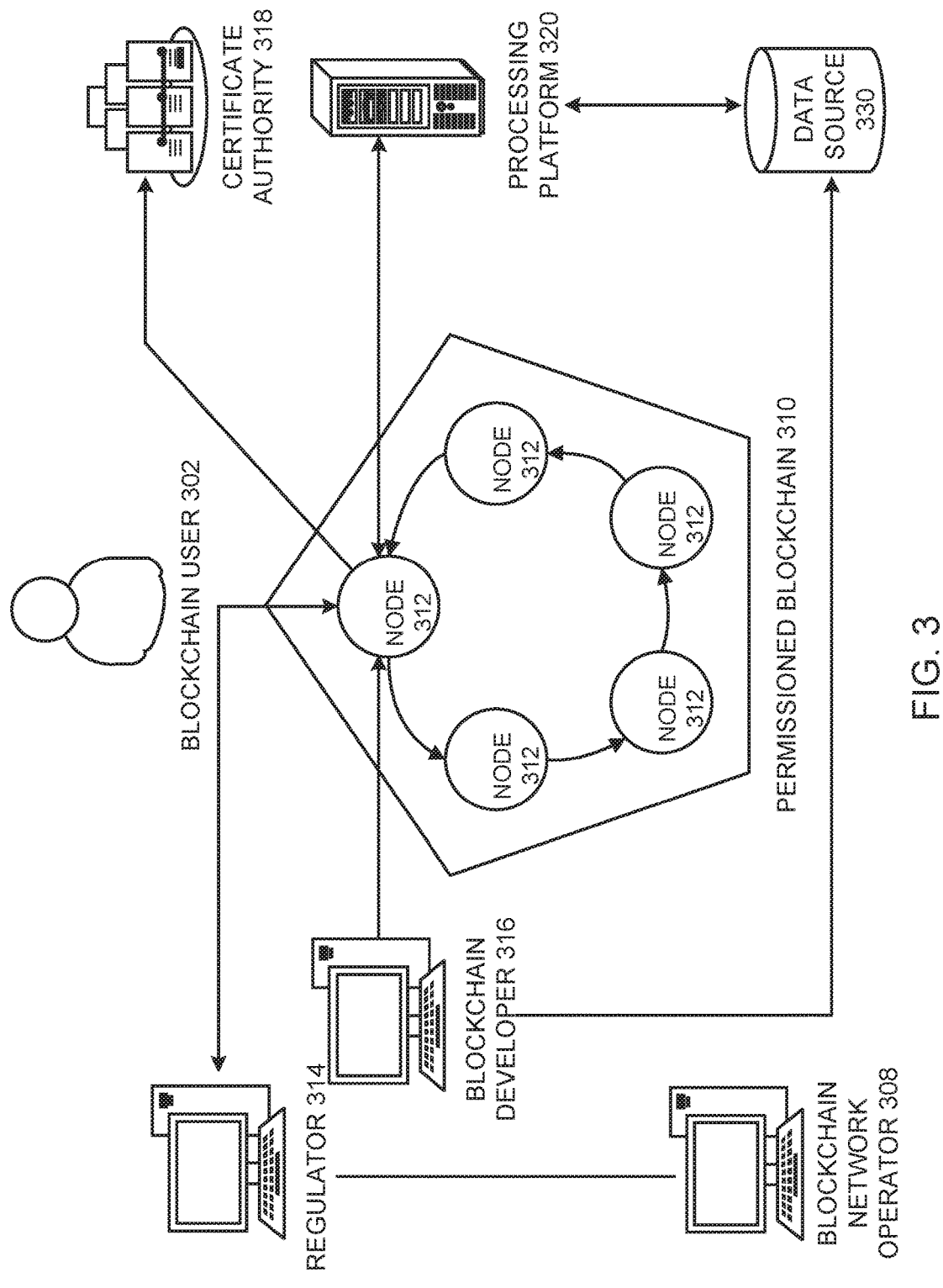
FIG. 3 is a diagram illustrating a permissioned blockchain network, according to example embodiments.
Figure 4:
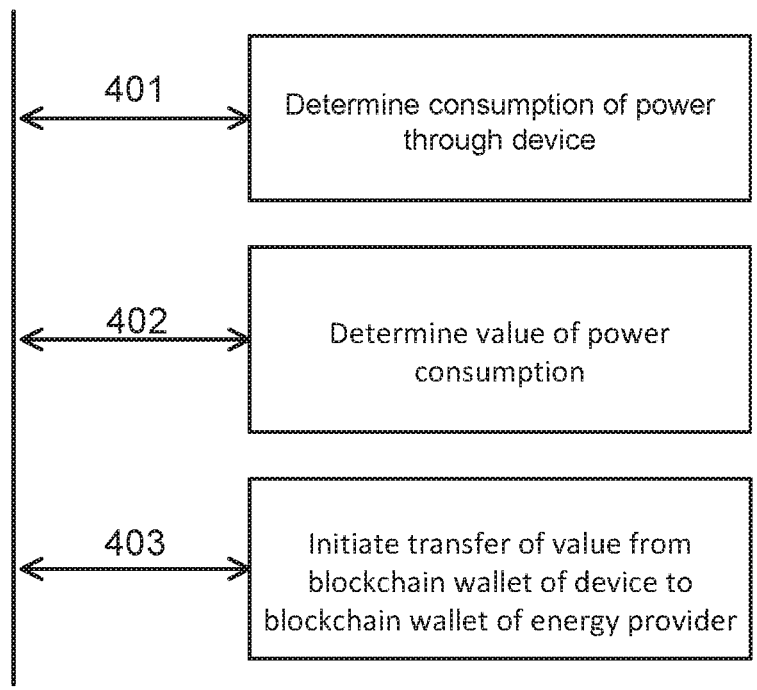
FIG. 4 illustrates a flow diagram of an example method for self-managing electricity supply and accounting by a device, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Blockchain networks of the type described above may be used to process payments for many users. Typically, payments are made between users and companies by transferring value from a user wallet to a company wallet. In the present embodiments, the blockchain wallet is created at the device level to enable individual devices to self-manage the accounting and payment for the device's energy consumption. A client application that executes within the device provides the logic for calculating the cost for the energy consumed and the budget available.

In accordance with an embodiment of the present invention, there is provided a system and method by which the charge for energy consumption is decentralized from a centralized bill to individual devices. At step 401, a device determines the power consumption for power through the device. The power may be consumed by the device itself, or by one or more second devices connected to the device. The power consumption may be a forecast consumption or a previous consumption. At step 402, the device calculates a value for the power consumed and then initiates a transfer of value from a device wallet to a power provider wallet 403.

Figure 5:
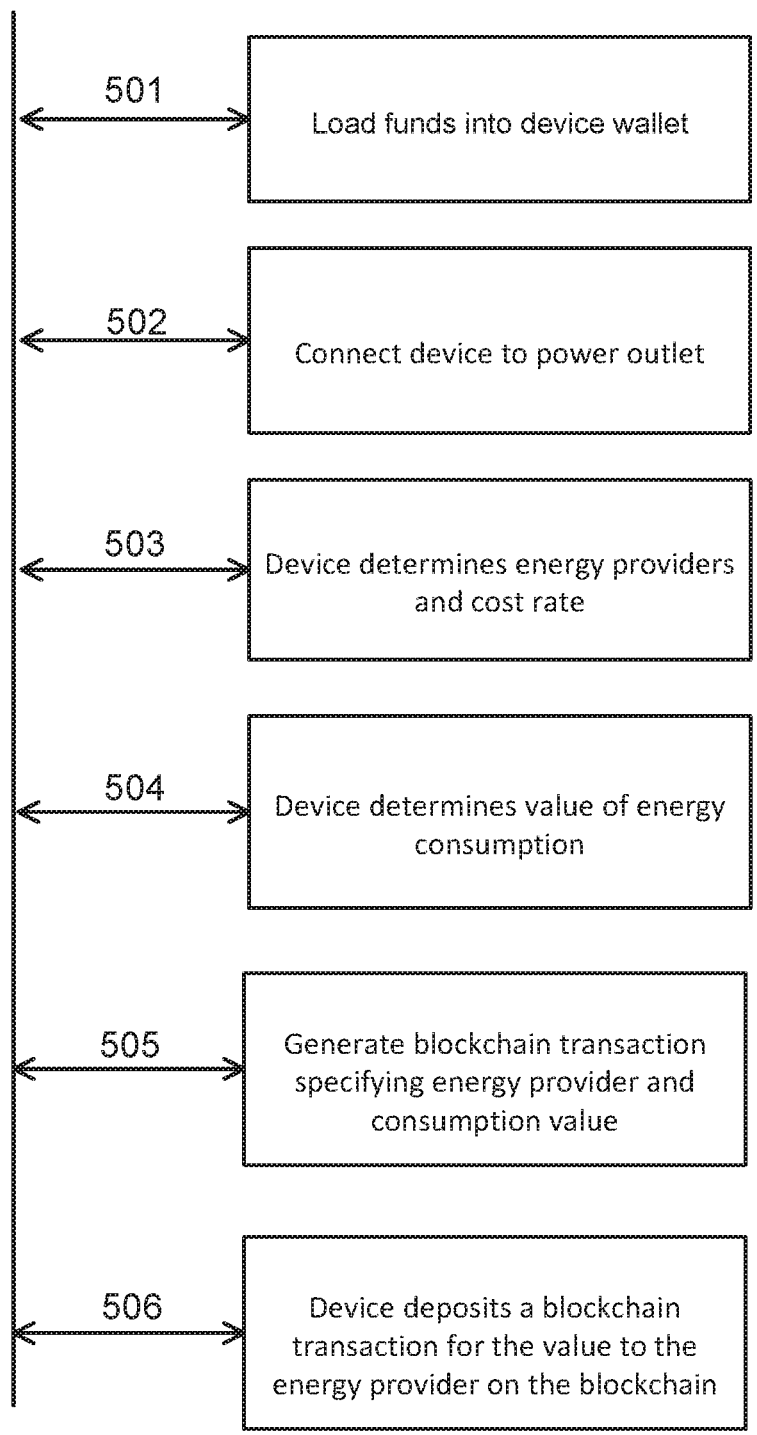
FIG. 5 illustrates a flow diagram of an example method for managing power consumption accounting on a blockchain.

FIG. 5 shows a flowchart 500 for a specific method in accordance with example embodiments. At step 501, a user adds funds to a device's blockchain wallet. At step 502, the device is plugged into an electrical outlet and begins operation. The device establishes an internet or communications network connection to a source of energy provider data and the device selects an energy provider at an associated cost rate (step 503). The device calculates a value of energy consumption 504 and generates a blockchain transaction (e.g. smart contract) that specifies the consumption value and the energy provider wallet as the recipient address 505. The device 120 then deposits the smart contract on the blockchain 506, by submitting the smart contract to a network peer, endorsing node, etc. of the blockchain network.

The calculated energy consumption may be a forecast or anticipated consumption or may be a past consumption, either an actual measured consumption or an estimate.

The device 120 may be programmed so that electrical power to any of the main power consumption components, or any connected power consuming devices, is prevented until there is sufficient funds in the blockchain wallet. The device and/or supplier may allow small amounts of power to be consumed for free for managing the device wallet.

The blockchain transaction may be conducted at various times and intervals, depending on factors including the nature of the device, the requirements of the energy provider, the funds available in the device wallet, user preferences, etc. For example, a permanently connected device such as a refrigerator may account for its power consumption over long intervals, e.g. daily, weekly, etc. Some devices that are used intermittently may have a shorter accounting period, e.g. hourly, whereas other devices that are repeatedly connected and disconnected, such as mobile phone chargers, may prepare a blockchain contract for every time they are connected to an outlet.

The method 500 of FIG. 5 may be implemented across many devices and many energy providers. The method eliminates the need to have an account or a responsible party for the energy consumed on a certain location by decentralizing the charge for the energy consumption from a centralized bill to individual devices, thereby removing the need for a central meter on the premises and the reading thereof. Each device manages energy consumption individually and, importantly, each device handles the financial process using blockchain via a blockchain wallet that is uniquely assigned to the device. The use of blockchain technology ensures a secure billing process that needs a consensus to be approved. Consensus may be reached on location, contract, wallet ID amongst other aspects of the transaction.

The blockchain intelligence that enables the device to be self-managing in terms of its power supply, consumption and accounting, is provided by a client application that runs as software 126 on the computing hardware components 124, 125 of the device 120 (see FIG. 1B) and/or within the device wallet 122 The client application is associated with the device blockchain wallet which comes with a hash code to identify the wallet.

The client application is programmed to search for a power provider and the energy cost rate for the provider for the device's location. The cost rate may be a fixed rate or a time based rate, e.g. having a peak rate, off-peak rate, shoulder rate, etc. If the device 120 has a screen or similar that can provide a user interface, then the user may be provided to enter or at least verify location data and may be given an option to choose an energy plan from a list of providers. Alternatively, if the device 120 does not provide a user interface, the device may be programmed to conduct its own internet search and energy provider selection. The device may access internet links via a communication link to a premises router. The link may be a WiFi link or cable link. Alternatively, the device may include a mobile communications module. Alternatively, the device may receive communication signals via the electrical supply lines.

Once the client application has determined a power provider for the device and the advertised cost rate for the selected power provider, the client is able to generate a smart contract for the power supply. The client application is able to the check the device's blockchain wallet balance to determine the funds available and determine the device's energy consumption requirements. The client application then generates a blockchain transaction for a value of the energy consumption based on the cost rate.

In one embodiment, the smart contract operates as a payment in advance for energy costs of the device. The client application obtains a cost rate for an energy provider, forecasts an energy consumption for the device, and if the forecast value can be met by the funds in the device's wallet, prepares a smart contract based on that value and deposits the contract on the blockchain.

The device then monitors the energy consumption of the device using internal metering (e.g. via internal meter 128) and real-time cost rates, including any time-varying rates, and operates until an amount of energy equivalent to the smart contract value has been consumed. The client application may include actual consumption data as a transaction on the blockchain to provide integrity to the accounting system.

The payment in advance system has a benefit by informing the energy provider of the power requirements. The energy provider can therefore ensure that the supply demands of the device can be met by the provider.

In an alternative embodiment, payment may be made in arrears. The client application may monitor power usage by the device with the knowledge of the amount of funds in the device's wallet and the real-time cost rate of the power from a provider, including any time-varying rate. Periodically, e.g. hourly, daily, etc., every time the device is connected/disconnected, or if the wallet funds have been exhausted, the client application on the device prepares a smart contract that provides an account of the power consumed, the real-time cost rate including cost fluctuations during the peak/off-peak cycle, and the value to be transferred from the device wallet to the provider wallet. The client application deposits the transaction on the blockchain.

The device software is responsible for checking if funds are available on the device's wallet for the energy consumption and to carry out the real-time cost calculation and withdraw from the device's wallet. Once a connection is established with the internet, the device's wallet will conclude the blockchain transaction by initiating the sending of the funds to the power provider's blockchain wallet.

The client application may be programmed to periodically re-conduct the search of power providers to ensure that the device continues to receive the most favorable power supply, e.g. at the lowest cost rate.

Prior to the initial start-up, the user that purchases the self-managing device allocates funds to the device's blockchain wallet. The user may allocate funds in a single transaction. In one embodiment, the user may be responsible for multiple devices. The user may create a recurring transaction to periodically transfer funds into the blockchain wallets of each of the user's devices to ensure that each device is able to manage its power requirements and accounting for continuous operation with an uninterrupted power supply. If at any time the client application on the device determines that there is insufficient funds to continue operation, the device may revert to drawing power from the electrical outlet only for wallet management functions. Other functions of the device may shut down, stop charging, or revert to battery power if available. Notifications may be sent to the user responsible for the device to enable the user to deposit more funds into the device's wallet.

The device itself is responsible for measuring the amount of power consumed. Metering may be simple metering. For example, the device may be configured with an energy rating that states the average consumption per operational hour. The device may use this simple rate of consumption to calculate an overall consumption. Alternatively, metering may include metering components to measure the actual energy consumed by the device, in particular during fluctuating power loads on the device.

A user can add funds to the device wallet using available blockchain wallet management. The user that adds the funds need not be the purchasing user. Any user with a vested interest in operating the device may be allowed to add funds to the device's wallet. This allows ownership of the device to change without the need for changes in billing entity, billing address, etc. Smart contracts may be employed within the blockchain network to only certain authorized users to contribute funds to a device's wallet.

In one embodiment, the device may be a powerpoint, powerboard, or similar with metering, a processor, client application and associated blockchain wallet. The device may allow non-blockchain powered devices to be billed via a blockchain wallet of the powerpoint.

The use of a blockchain network or similar cryptographic distributed ledger as described herein for use in self-management of power accounting by power consuming devices may have several advantages. Funds may be verified prior to energy consumption with the cost rate communicated at the time of energy consumption. There is the possibility of using a decentralized power grid provider and there is no need to change the current layout of outlets. The blockchain network removes the need for a responsible party for energy consumption account, removes the need for a billing address and provides secured, consensus based payments. Devices can be sold or exchanged without the need to transfer account or responsible party because the blockchain wallet is associated directly to the device.

Figure 6A:
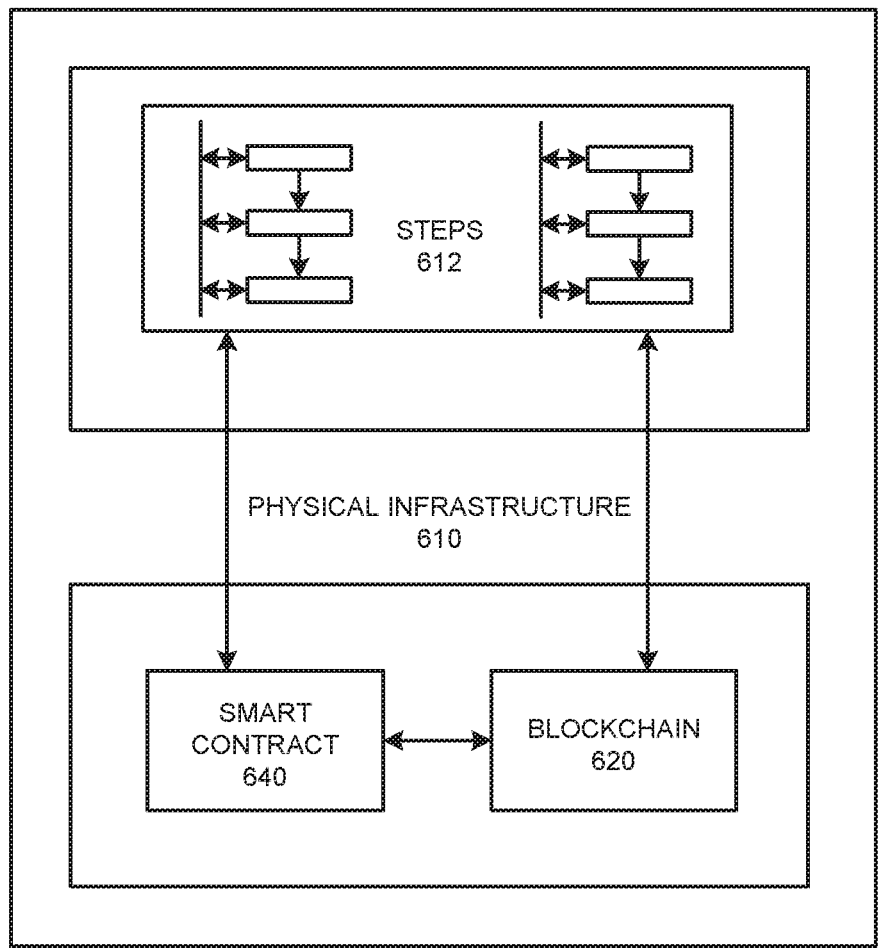
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
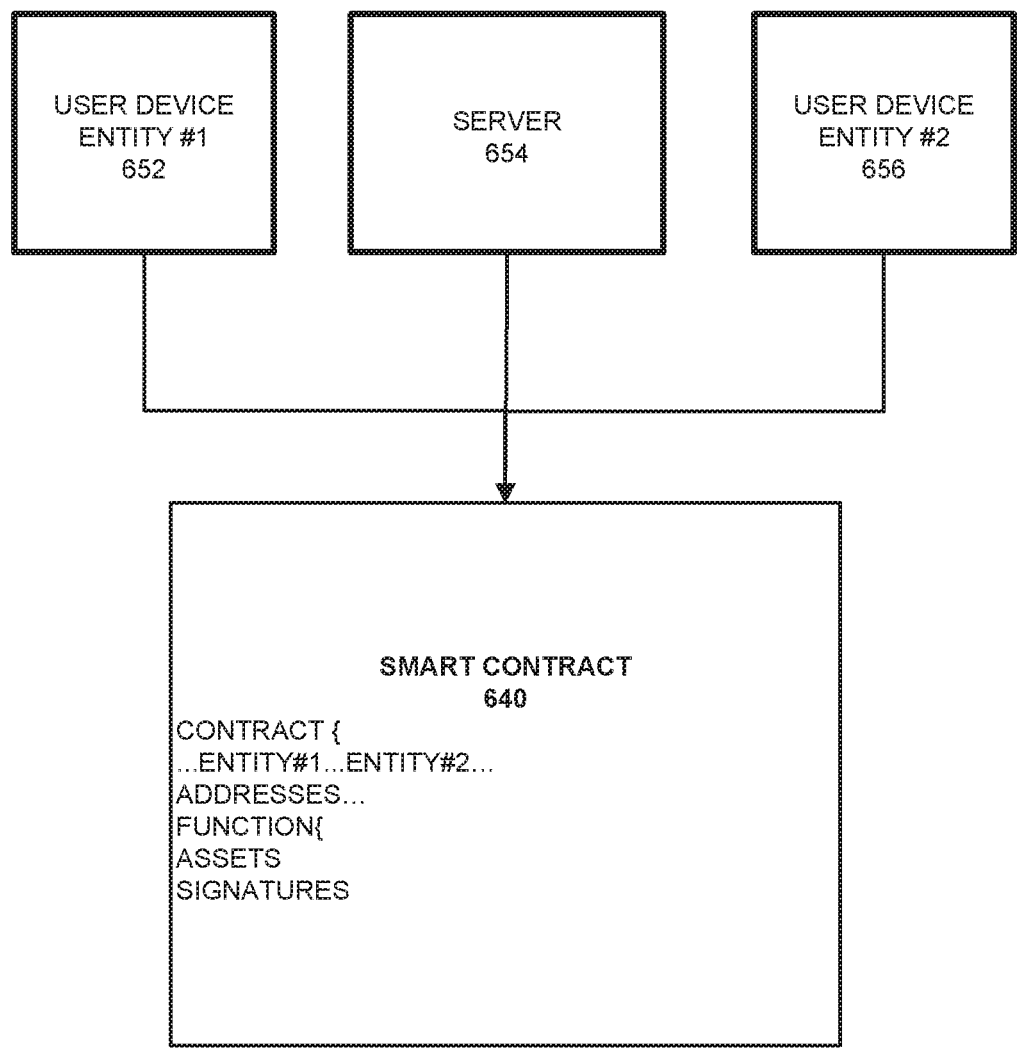
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
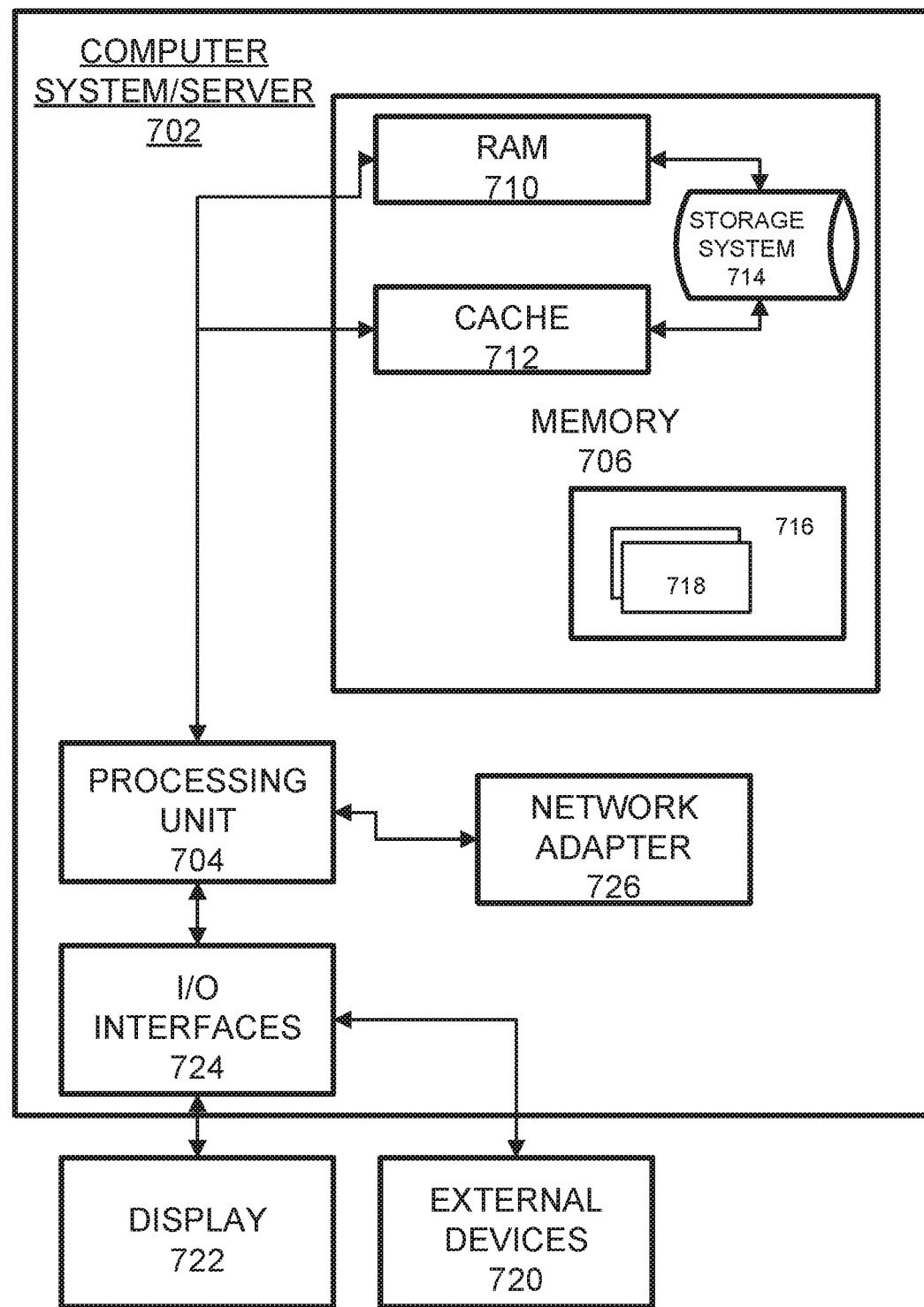
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   determining, by a device, a power consumption for power through the device and a value for the power consumption; and
   creating, by the device, a blockchain transaction which transfers the value from a device blockchain wallet associated with the device to a provider blockchain wallet of an energy provider and submitting the blockchain transaction to a blockchain peer,
   wherein a program on the device limits the power consumption by the device and allows a partial amount of the power to be consumed by the device for managing the device blockchain wallet until the transfer of the value from the device blockchain wallet is performed.

2. The method of claim 1 comprising determining, by the device, the energy provider and a cost rate of energy supplied by the energy provider.

3. The method of claim 2 comprising selecting, by the device, a lowest cost energy provider for the power consumption.

4. The method of claim 1 wherein the device blockchain wallet is uniquely associated to the device.

5. The method of claim 1 comprising receiving a value into the device blockchain wallet from a user blockchain wallet of a purchaser of the device.

6. The method of claim 1 comprising generating, by the device, a smart contract for the blockchain, wherein the smart contract indicates the device blockchain wallet, the blockchain wallet of the energy provider, and the value.

7. The method of claim 1 comprising measuring the power consumption of one or more power consuming components of the device.

8. The method of claim 1 comprising measuring the power consumption of one or more power components connected through the device.

9. A device, comprising:
   one or more power meters that measure power consumption through the device;
   one or more processors configured to:
      determine a value of power consumption for the device,
      create a blockchain transaction which transfers the value of power consumption for the device from a device blockchain wallet associated with the device to a provider blockchain wallet of an energy provider, and
      submit the blockchain transaction to a blockchain peer,
      wherein a program on the device limits the power consumption by the device and allows a partial amount of the power to be consumed by the device for managing the device blockchain wallet until the transfer of the value from the device blockchain wallet is performed.

10. The device of claim 9 wherein the one or more processors are configured to select the energy provider and a cost rate of energy supplied by the energy provider.

11. The device of claim 10 wherein the one or more processors are configured to select a lowest cost energy provider for the power consumption.

12. The device of claim 9 comprising the blockchain wallet, wherein the blockchain wallet is uniquely associated with the device.

13. The device of claim 9 comprising one or more power consuming components wherein the one or more power meters measure power consumption of the one or more power consuming components.

14. The device of claim 9 wherein the one or more processors are configured to generate a smart contract for the blockchain, wherein the smart contract indicates the device blockchain wallet, the blockchain wallet of the energy provider, and the value.

15. A non-transitory computer readable medium comprising instructions, that when read by a processor, cause the processor to perform:
   calculating a cost of power consumption for a device associated with a blockchain wallet; and
   creating, by the device, a blockchain transaction which transfers the value for the cost of power consumption for the device from the blockchain wallet associated with the device to a blockchain wallet of an energy provider and submitting the blockchain transaction to a blockchain peer,
   wherein a program on the device limits the power consumption by the device and allows a partial amount of the power to be consumed by the device for managing the device blockchain wallet until the transfer of the value from the device blockchain wallet is performed.

16. The non-transitory computer readable medium of claim 15 wherein the instructions cause the processor to perform selecting the energy provider and a cost rate of energy supplied by the energy provider.

17. The non-transitory computer readable medium of claim 15 wherein the device blockchain wallet is uniquely associated to the device.

18. The non-transitory computer readable medium of claim 15 wherein the device blockchain wallet is programmed to receive a value from a blockchain wallet of a purchaser of the device.

19. The non-transitory computer readable medium of claim 15 wherein the instructions cause the processor to perform generating a smart contract for the blockchain, wherein the smart contract indicates the device blockchain wallet, the blockchain wallet of the energy provider, and the value.

* * * * *